(12) United States Patent
Fihri et al.

(10) Patent No.: US 12,145,296 B2
(45) Date of Patent: Nov. 19, 2024

(54) SCRATCH RESISTANT TRANSPARENT ARTICLES AND METHODS OF MAKING THE SAME

(71) Applicant: Saudi Arabian Oil Company, Dhahran (SA)

(72) Inventors: Aziz Fihri, Paris (FR); Enrico Bovero, Dhahran (SA); Yassine Malajati, Beachwood, OH (US); Haleema Alamri, Thuwal (SA); Abdullatif Jazzar, Khobar (SA); Hussain Baqer Tuwailib, Alqatif (SA)

(73) Assignee: Saudi Arabian Oil Company, Dhahran (SA)

( * ) Notice: Subject to any disclaimer, the term of this patent is extended or adjusted under 35 U.S.C. 154(b) by 1114 days.

(21) Appl. No.: 16/778,380

(22) Filed: Jan. 31, 2020

(65) Prior Publication Data

US 2021/0213652 A1 Jul. 15, 2021

(51) Int. Cl.
| | |
|---|---|
| B29C 39/00 | (2006.01) |
| B29B 7/90 | (2006.01) |
| B29C 43/00 | (2006.01) |
| C08K 9/06 | (2006.01) |
| B29K 105/16 | (2006.01) |
| B29K 509/02 | (2006.01) |

(52) U.S. Cl.
CPC ............... B29C 39/003 (2013.01); B29B 7/90 (2013.01); B29C 43/003 (2013.01); C08K 9/06 (2013.01); *B29K 2105/162* (2013.01); *B29K 2509/02* (2013.01); *B29K 2995/0026* (2013.01); *C08K 2201/011* (2013.01)

(58) Field of Classification Search
CPC ....... B29C 39/003; B29C 43/003; B29B 7/90; C08K 9/06; C08K 2201/011; B29K 2105/162; B29K 2509/02; B29K 2995/0026
See application file for complete search history.

(56) References Cited

U.S. PATENT DOCUMENTS

| | | | |
|---|---|---|---|
| 8,258,206 B2 | 9/2012 | Kanagasabapathy et al. | |
| 9,688,784 B2* | 6/2017 | Okel | ............... C08L 33/02 |
| 2006/0244355 A1* | 11/2006 | Park | ............... C08K 3/36 |
| | | | 345/82 |
| 2009/0269568 A1 | 10/2009 | Kuhlmann et al. | |
| 2010/0288333 A1 | 11/2010 | Temchenko et al. | |
| 2015/0126657 A1 | 5/2015 | Okel et al. | |
| 2016/0115335 A1 | 4/2016 | Kostromine et al. | |
| 2016/0152833 A1 | 6/2016 | Kostromine et al. | |
| 2017/0358771 A1 | 12/2017 | Brotzman et al. | |

FOREIGN PATENT DOCUMENTS

| | | |
|---|---|---|
| EP | 1937762 A2 | 7/2008 |
| TW | I648356 B | 1/2019 |

OTHER PUBLICATIONS

U.S. Office Action dated Dec. 13, 2022 pertaining to U.S. Appl. No. 16/950,249, filed Nov. 17, 2020, 18 pages.
International Search Report and Written Opinion dated Sep. 4, 2020 pertaining to International application No. PCT/IB2020/050308 filed Jan. 15, 2020.
Loste, J. et al. "Transparent polymer nanocomposites: An overview on their synthesis and advanced properties" Progress in Polymer Science, Pergamon Press, Oxford, GB, vol. 89, Nov. 1, 2018, pp. 133-158.
Chujo et al., "Organic polymer hybrids with silica-gel formed by means of the sol-gel method", Adv. Polm. Sci. 1992, 100, 11-29.
Novak, "Hybrid nanocomposite materials-between inorganic glasses and organic polymers", Adv. Mater. 1993, 5, 422-433.
Kim et al., "Processing-property relationship of polycarbonate/graphene composite", Polym. 2009, 50, 3797-3809.
Cai et al., "Preparation and properties of polycarbonate/polyhedral oligomeric silsesquioxanes (POSS) hybrid composites", Polym. Adv. Technol. 2012, 23, 765-775.
Montaung et al., "The effect of silica nanoparticles on the morphology, mechanical properties and thermal degradation kinetics of polycarbonate", Compos. Sci. Technol. 2012, 73, 34-39.
Feng et al., "Effect of modified silica on morphology, mechanical property and thermostability of injection molded polycarbonate/silica nanocomposites", J. Reinf. Plast. Compos. 2014, 33, 1-12.
Han et al., "Preparation and characterization of long chain branched polycarbonate with significantly enhanced environmental stress cracking behavior through gamma radiation with addition of dysfunctional monomer", Polym. Chem. 2016, 7, 3551-3561.
Phua et al., "Injection molded short glass and carbon fibers reinforced polycarbonate hybrid composites: Effects of fiber loading", J. Reinf. Plast. Compos, 29, 17/2010.
Lee et al., "High-refractive-index thin films prepared from trialkoxysilane-capped poly(methyl methacrylate)-titania materials", Chem. Mater. 2001, 13, 1137-1142.

(Continued)

*Primary Examiner* — Edward J Cain
(74) *Attorney, Agent, or Firm* — DINSMORE & SHOHL LLP

(57) ABSTRACT

Transparent articles and methods of producing transparent articles are provided. The transparent article includes hydrophobic nanoparticles dispersed within poly(methyl methacrylate). The method of producing transparent articles includes pouring a transparent article precursor into a mold, the transparent article precursor comprising nanoparticles, a solvent, and a polymer, and the mold comprising a flat surface. The method also includes placing the mold into a container having an adjustable opening and allowing the solvent to evaporate from the transparent article precursor, thereby forming the transparent article over the flat surface of the mold. The method further includes flattening the transparent article, in which flattening the transparent article includes positioning a flat article on a first side of the transparent article, and compressing the transparent article between the flat surface and the flat article.

20 Claims, 2 Drawing Sheets

(56) References Cited

OTHER PUBLICATIONS

Rashahmadi et al., "Improving the mechanical properties of poly methyl methacrylate nanocomposites for dentistry applications reinforced with different nanoparticles", Polym. Plast. Technol. Eng. 2017, 56, 1730-1740.
Thomassin et al., "Poly(methyl methacrylate)/graphene oxide nanocomposites by a precipitation polymerization process and their dielectric and rheological characterization", Macromolecules, 2014, 47, 2149-2155.
Mbese et al., "Preparation and characterization of ZnS, CdS and HgS/poly(methyl methacrylate)nanocomposites", Polymers 2014, 6, 2332-2344.
Sharma et al., "Preparation and Characterization of Transparent ZnO/Polymethyl methacrylate Nanocomposites", Phenomena, Materials, Devices, and Characterization, AIP Conf. Proc., 1391, 627-629, 2011.

\* cited by examiner

SCRATCH RESISTANT TRANSPARENT ARTICLES AND METHODS OF MAKING THE SAME

CROSS REFERENCE TO RELATED APPLICATION

This application claims the benefit of priority under 35 U.S.C. § 119(a) to International Application No. PCT/IB2020/050308, filed Jan. 15, 2020, which International Application designates the United States.

BACKGROUND

Field

The present specification generally relates to transparent articles and, more particularly, to transparent articles including nanoparticles and methods for forming the same.

Technical Background

Transparent articles may be utilized in a vast array of products and industries, including, for example, photovoltaic applications, building and construction materials, automotive applications, and aviation applications. Transparent articles may be used as solar panels, optical lenses, concentrated mirrors and lenses within solar power systems, microscopes, electronics, LCD and plasma screens, and bulletproof windows, among other applications. In all such applications, optical transparency and mechanical properties are important considerations. Particularly, the mechanical property of scratch resistance directly affects the ability of the transparent articles to remain sufficiently transparent, as scratches can severely diminish transparency. Additionally, transparent articles should be free of defects such as voids or inclusions and should have uniform compositions that enable the transparent articles to consistently transmit light of the wavelength range requiring transmission in the chosen application.

Accordingly, ongoing needs exist for transparent articles with improved mechanical properties, including improved scratch resistance, minimum void defects, and increased transparency over various wavelengths. Further, ongoing needs exist for methods for producing the transparent articles that optimize the mechanical properties of the transparent articles, such as abrasion resistance and hardness, and the optical properties of the transparent articles, such as improving haze.

SUMMARY

Some embodiments of the present disclosure are directed to methods of producing a transparent article. The methods include pouring a transparent article precursor into a mold that may have a flat surface onto which the precursor is poured. The transparent article precursor includes nanoparticles, a solvent, and a polymer. The methods also include placing the mold into a container having an adjustable opening and allowing the solvent to evaporate from the transparent article precursor, thereby forming the transparent article over the flat surface of the mold. The methods further include flattening the transparent article to optimize optical characteristics and to minimize defects, for example. Flattening the transparent article may include positioning a flat article on a first side of the transparent article opposite the flat surface of the mold, then compressing the transparent article between the flat surface and the flat article.

According to further embodiments of the present disclosure, methods of producing a transparent article may include mixing nanoparticles, a solvent, and a polymer to form a transparent article precursor. The nanoparticles include hydrophobic nanoparticles that are products of reacting silica nanoparticles, titanium oxide nanoparticles, zinc oxide nanoparticles, zirconium oxide nanoparticles, or combinations thereof, with a modifying agent that render the nanoparticles hydrophobic. The modifying agent may be chosen from alkylsilanes, alkoxysilanes, alkylalkoxysilanes, alkylhalosilanes, alkoxyhalosilanes, alkylalkoxyhalosilanes, (haloalkyl)silanes, (haloalkoxy)silanes, (haloalkyl)alkoxysilanes, alkyl(haloalkoxy)silanes, (haloalkyl)(haloalkoxy)silanes, (haloalkyl)halosilanes, (haloalkoxy)halosilanes, (haloalkyl)alkoxyhalosilanes, alkyl(haloalkoxy)halosilanes, (haloalkyl)(haloalkoxy)halosilanes, and combinations thereof. The solvent may be selected from $C_2$-$C_5$ chloroalkanes, $C_2$-$C_5$ fluoroalkanes, monohalomethanes, dihalomethanes, and trihalomethanes, and combinations thereof. The polymer may be or may include poly(methyl methacrylate). The methods also include pouring the transparent article precursor into a mold comprising a flat surface, placing the mold into a container having an adjustable opening, and closing the adjustable opening of the container after placing the mold into the container. The methods further include opening the adjustable opening of the container after closing the adjustable opening of the container, and allowing the solvent to evaporate from the transparent article precursor, thereby forming the transparent article over the flat surface of the mold. The methods further include flattening the transparent article, in which flattening the transparent article includes positioning a flat article on a first side of the transparent article, and compressing the transparent article between the flat surface and the flat article.

Still further embodiments of the present disclosure include transparent articles including hydrophobic nanoparticles dispersed within a polymer chosen from poly(methyl methacrylate), polycarbonate, polystyrene, polyetherimide, and acrylonitrile butadiene styrene.

Specific embodiments will now be described with references to the figures. Whenever possible, the same reference numerals will be used throughout the drawings to refer to the same or like parts. As used throughout this disclosure, the singular forms "a," "an" and "the" include plural referents unless the context clearly dictates otherwise. Thus, for example, reference to "a" component includes aspects having two or more such components, unless the context clearly indicates otherwise.

BRIEF DESCRIPTION OF THE DRAWINGS

The following detailed description of specific embodiments of the present disclosure can be best understood when read in conjunction with the following drawings.

DETAILED DESCRIPTION

Figure 1:
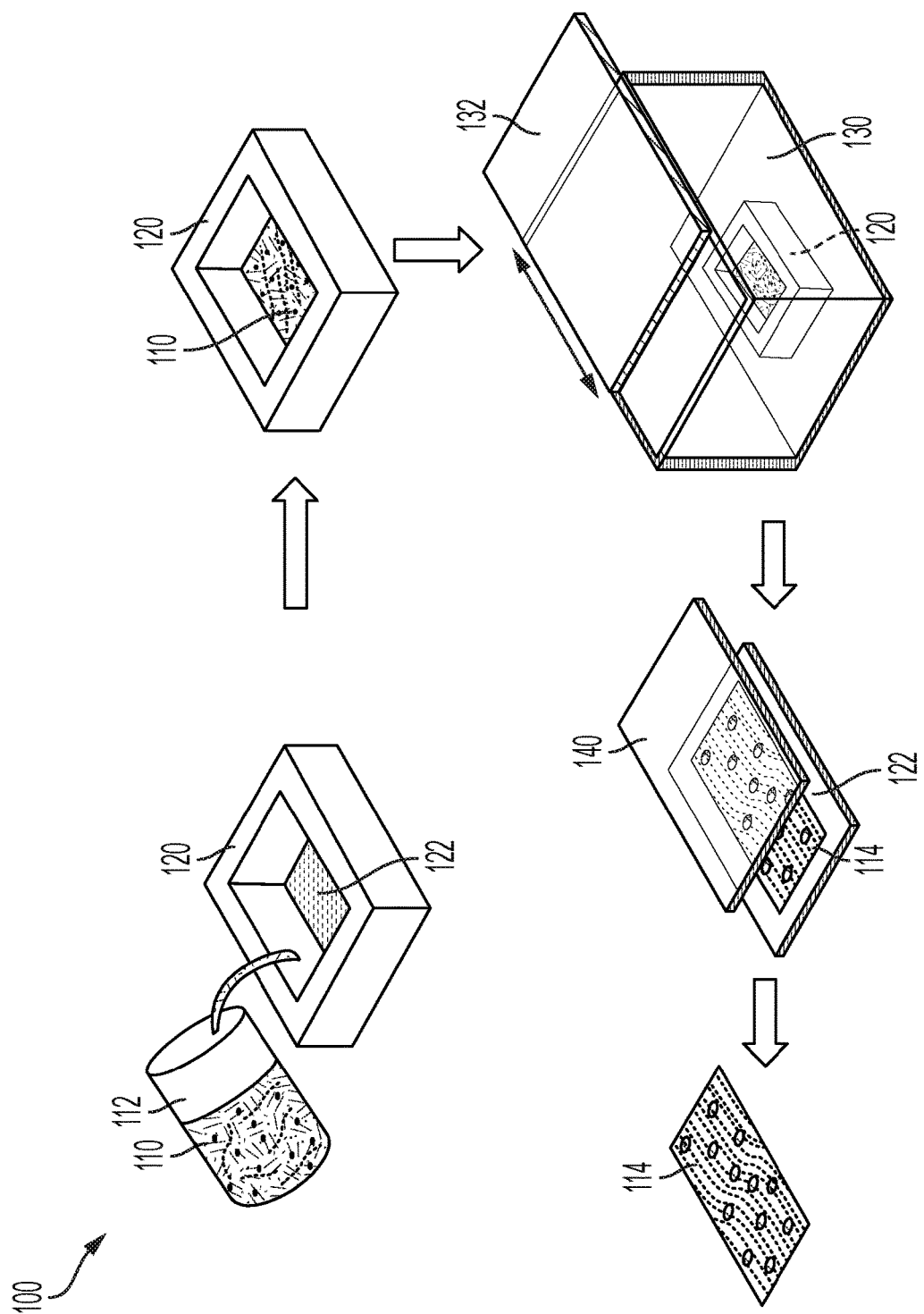
FIG. 1 is a schematic diagram of a process for producing transparent articles according to embodiments shown and described.

Embodiments of transparent articles will now be described. Embodiments of methods for producing the transparent articles will be described subsequently.

Transparent articles according to embodiments of the present disclosure include nanoparticles dispersed within a polymer. The transparent articles may exhibit increased scratch resistance, improved mechanical properties, and decreased incidence void defects compared to the properties of the polymer without nanoparticles. The transparent articles may have properties desirable for incorporating the transparent articles in optical applications such as in photovoltaic panels, solar panels, lenses, mirrors, and windows. Conventionally, transparent articles are susceptible to scratches that can diminish the optical properties and impede the overall performance of the transparent article. For example, for a transparent article having a smooth, flat surface with no scratches, incident light rays contact the surface at a nearly identical angle of incidence. Thereby, undesirable phenomena such as reflection, scattering, and refraction can be minimized, and a maximum amount of light can be transmitted. By comparison, if a transparent article has scratches on its surface, light rays contact the surface at varying angles, causing many of them to be reflected, scattered or refracted. The reflection, scattering, or refraction of light rays results in a reduced amount of transmitted light.

The transparent articles according to embodiments include nanoparticles dispersed within a polymer. The polymer may be any polymer material having optical characteristics, such as transparency over visible wavelengths, infrared (IR) wavelengths, ultraviolet (UV) wavelengths, or a combination of these, generally desirable for optical applications. In some embodiments, the polymer may be or may include poly(methyl methacrylate) (PMMA). Further examples of suitable polymers include polycarbonate, polystyrene, polyetherimide, acrylonitrile butadiene styrene (ABS).

In the transparent articles according to embodiments, the nanoparticles may include nanoparticles of a composition chemically compatible with the polymer and having a size range and distribution that does not diminish optical transparency of the polymer itself. The nanoparticles also may impart improved mechanical characteristics and scratch resistance to the transparent article. In particular, the nanoparticles may impart improved strength and tensile behavior of the transparent article, decreasing the likelihood of breakage, scratching, or shattering of the transparent article as compared to transparent articles without nanoparticles. As nonlimiting examples, the nanoparticles may include silica nanoparticles, titanium oxide nanoparticles, zinc oxide nanoparticles, zirconium oxide nanoparticles, alumina nanoparticles or combinations thereof.

In some embodiments, the nanoparticles of the transparent article may include hydrophobic nanoparticles. Without intending to be bound by theory, the hydrophobic nature of the nanoparticles may result in increased dispersion within the solvents described herein, particularly during preparation of the transparent article. Additionally, the hydrophobic nature of the nanoparticles may result in reduced nanoparticle agglomeration within the polymer matrix.

The hydrophobic nanoparticles may be a product of a reaction of the nanoparticles as previously described and a modifying agent. The modifying agent may be chosen from alkylsilanes, alkoxysilanes, alkylalkoxysilanes, alkylhalosilanes, alkoxyhalosilanes, alkylalkoxyhalosilanes, (haloalkyl)silanes, (haloalkoxy)silanes, (haloalkyl)alkoxysilanes, alkyl(haloalkoxy)silanes, (haloalkyl)(haloalkoxy)silanes, (haloalkyl)halosilanes, (haloalkoxy)halosilanes, (haloalkyl)alkoxyhalosilanes, alkyl(haloalkoxy)halosilanes, (haloalkyl)(haloalkoxy)halosilanes, and combinations thereof. In embodiments, the modifying agent may include dimethyldichlorosilane, methyltriethoxysilane, ethyltriethoxysilane, pentyltriethoxysilane, dodecyltriethoxysilane, or combinations thereof. In embodiments, the modifying agent may include a fluorosilane. Non-limiting examples of fluorosilanes include perfluorooctyltriethoxysilane, (tridecafluoro-1,1,2,2-tetrahydrooctyl)triethoxysilane, nonafluorohexyltriethoxysilane.

The hydrophobic nanoparticles thus may include a nanoparticle material, as previously described, to which siloxane functionalities are bonded. The siloxane functionalities include the hydrophobic groups of the modifying agent. Thereby, the hydrophobic nanoparticles include hydrophobic groups at least partly surrounding the nanoparticle material itself.

As used herein, "alkyl" refers to hydrocarbon radicals of the formula $—C_xH_{2x+1}$, where x is from 1 to 20, or from 1 to 10, or from 1 to 5. As used herein, "alkoxy" refers to radicals of the formula $—OC_xH_{2x+1}$, where x is from 1 to 20, or from 1 to 10, or from 1 to 5. As used herein, the term "halo" means chloro or fluoro. As used herein, "haloalkyl" refers to an alkyl radical, as previously defined, in which at least one hydrogen atom is replaced with chloro or fluoro. As used herein, "haloalkoxy" refers to an alkoxy radical, as previously defined, in which at least one hydrogen atom is replaced with chloro or fluoro. As should be understood, "silane" refers to the compound $SiH_4$. The various modifying agents previously described are silane compounds of a formula $SiX_nH_{4-n}$, where n is 1, 2, or 3; and each X is independently chosen from alkyl, alkoxy, halo, haloalkyl, or haloalkoxy, as previously defined.

The transparent article may include an amount of nanoparticles dispersed within the polymer that both improves the mechanical properties of the polymer and does not diminish optical transparency over desirable wavelength ranges. In example embodiments, the transparent article may include from 0.5 weight percent (wt. %) to 10.0 wt. %, from 0.5 wt. % to 7.0 wt. %, from 0.5 wt. % to 5.0 wt. %, from 0.5 wt. % to 4.0 wt. %, from 0.5 wt. % to 3.0 wt. %, from 0.5 wt. % to 2.5 wt. %, from 0.5 wt. % to 2.0 wt. %, from 0.5 wt. % to 1.0 wt. %, from 1.0 wt. % to 10.0 wt. %, from 1.0 wt. % to 7.0 wt. %, from 1.0 wt. % to 5.0 wt. %, from 1.0 wt. % to 4.0 wt. %, from 1.0 wt. % to 3.0 wt. %, from 1.0 wt. % to 2.5 wt. %, from 1.0 wt. % to 2.0 wt. %, from 2.0 wt. % to 10.0 wt. %, from 2.0 wt. % to 7.0 wt. %, from 2.0 wt. % to 5.0 wt. %, from 2.0 wt. % to 4.0 wt. %, from 2.0 wt. % to 3.0 wt. %, from 2.0 wt. % to 2.5 wt. %, from 2.5 wt. % to 7.0 wt. %, from 2.5 wt. % to 5.0 wt. %, from 2.5 wt. % to 4.0 wt. %, from 2.5 wt. % to 3.0 wt. %, from 3.0 wt. % to 10.0 wt. %, from 3.0 wt. % to 7.0 wt. %, from 3.0 wt. % to 5.0 wt. %, from 3.0 wt. % to 4.0 wt. %, from 4.0 wt. % to 10.0 wt. %, from 4.0 wt. % to 7.0 wt. %, from 4.0 wt. % to 5.0 wt. %, from 5.0 wt. % to 10.0 wt. %, from 5.0 wt. % to 7.0 wt. %, or from 7.0 wt. % to 10.0 wt. % nanoparticles, based on the total weight of the transparent article.

Without intending to be bound by hypothesis, it is believed that transparent articles having greater than 10.0 wt. % nanoparticles of a chosen type dispersed in a polymer may be less transparent than transparent articles of the same polymer having less than or equal to 10.0 wt. %, dispersed nanoparticles of the same type over identical wavelength ranges. Similarly, in embodiments, transparent articles having greater than 5.0 wt. % nanoparticles of a chosen type dispersed in a polymer may be less transparent than transparent articles of the same polymer having less than or equal to 5.0 wt. % dispersed nanoparticles of the same type over identical wavelength ranges. In embodiments, transparent articles having greater than 5.0 wt. % nanoparticles dispersed in polymer are not expected to have a transparency suitable for applications requiring high optical transparency, such as greater than 70% or greater than 80% over the visible spectrum (wavelengths from 400 nm to 750 nm). Transparent articles having less than 5.0 wt. % nanoparticle dispersed in a polymer are expected to have transparencies that are suitable for such applications. It is expected that transparent articles having greater than or equal to 0.5 wt. % nanoparticles dispersed in a polymer exhibit improved mechanical properties and greater scratch resistance relative to transparent articles of the same polymer but having less than 0.5 wt. % of the same type of nanoparticles.

The nanoparticles in the transparent articles according to embodiments have size ranges chosen to retain or improve optical transparency over a desired wavelength range while also imparting mechanical benefits such as greater scratch resistance as compared to a transparent article without nanoparticles. In embodiments, the nanoparticles have size ranges that do not reflect or scatter light in the visible spectrum (wavelengths from 400 nm to 750 nm) that passes through the transparent article.

Thus, in example embodiments, the nanoparticles may have particle sizes from 7 nanometers (nm) to 50 nm. The sphericity and roundness of the nanoparticles may vary based on the desired transparency and strength of the transparent article.

In embodiments, 99%, 98%, 97%, 95%, 93%, 90%, 87%, 85%, or 80% of the nanoparticles have a particle size of from 7 nm to 100 nm, from 7 nm to 90 nm, from 7 nm to 70 nm, from 7 nm to 50 nm, from 7 nm to 40 nm, from 7 nm to 30 nm, from 7 nm to 20 nm, from 7 nm to 15 nm, from 15 nm to 100 nm, from 15 nm to 90 nm, from 15 nm to 70 nm, from 15 nm to 50 nm, from 15 nm to 40 nm, from 15 nm to 30 nm, from 15 nm to 20 nm, from 20 nm to 100 nm, from 20 nm to 90 nm, from 20 nm to 70 nm, from 20 nm to 50 nm, from 20 nm to 40 nm, from 20 nm to 30 nm, from 30 nm to 100 nm, from 30 nm to 90 nm, from 30 nm to 70 nm, from 30 nm to 50 nm, from 30 nm to 40 nm, from 40 nm to 90 nm, from 40 nm to 70 nm, from 40 nm to 50 nm, from 50 nm to 100 nm, from 50 nm to 90 nm, from 50 nm to 70 nm, from 70 nm to 100 nm, from 70 nm to 90 nm, or from 90 nm to 100 nm. Without intending to be bound by hypothesis, it is contemplated that nanoparticles having a particle size greater than 100 nm may result in clustering and agglomerations of nanoparticles within the polymer matrix of the transparent article.

In some embodiments, the transparent article has a persistent dispersion homogeneity. The phrase "persistent dispersion homogeneity" means that a first concentration of the nanoparticles at any discrete point throughout the transparent article does not vary by more than 30% from a second concentration of the nanoparticles at any second discrete point throughout the transparent article. In other words, the concentration of the nanoparticles will not result in clumped nanoparticles at any point within the transparent article. In the embodiments described in this disclosure, the persistent dispersion homogeneity throughout the transparent article is such that, for a discrete point throughout the transparent article, the extrema (the minimum or maximum) of the concentration of nanoparticles is greater than or equal to about 70% and less than or equal to about 130% of the concentration of nanoparticles within the transparent article at any second discrete point of the transparent article.

The transparent article may have any shape suitable to its intended application. For example, the transparent article may be rectangular in shape, square in shape, circular in shape, ovoid in shape. In embodiments, the transparent article may be a flat sheet of any shape, where the flat sheet has a length, a width, and a depth or thickness, where the length, the width, or both, are from 2 to 1000 times greater, from 2 to 100 times greater, from 2 to 50 times greater, from 2 to 20 times greater, from 2 to 10 times greater, from 2 to 5 times greater, from 5 to 1000 times greater, from 5 to 100 times greater, from 5 to 50 times greater, from 5 to 20 times greater, from 5 to 10 times greater, from 10 to 1000 times greater, from 10 to 100 times greater, from 10 to 50 times greater, from 10 to 20 times greater, from 20 to 1000 times greater, from 20 to 100 times greater, from 20 to 50 times greater, from 50 to 1000 times greater, from 50 to 100 times greater, or from 100 to 1000 times greater than the depth or thickness. In embodiments, the transparent article may be a rectangular prism having a length, width, and depth, in which the depth is less than the length, and the length is less than the width. Similarly, the transparent article may be a square prism having a length, width, and depth, in which the depth is less than the length, and the length is substantially equal to the width. In yet another embodiment, the transparent article may be cylindrical, having a depth and a diameter, where the depth is less than the diameter.

Transparent articles have an optical transmittance that is the fraction of incident light of a specific wavelength which passes through the transparent article. Generally, optical transmittance to a specific wavelength is a value from 0%, indicating total opacity to the wavelength and complete absorption of the wavelength, to 100%, indicating total transparency to the wavelength and zero absorption of the wavelength. In embodiments, the transparent article may have an optical transmittance of greater than 50%, greater than 70%, greater than 80%, or greater than 85% over wavelengths from 400 nm to 750 nm.

Having generally described the transparent articles, embodiments of methods for producing the transparent articles will be described. In should be understood that the previous embodiments of the transparent articles include, but are not necessarily limited to, transparent articles produced by any embodiment of the methods for producing transparent articles to be described in this disclosure.

Referring to FIG. 1, methods 100 for producing a transparent article 114 may include mixing the nanoparticles, a solvent, and the polymer to form a transparent article precursor 110. The nanoparticles and the polymer may be selected according to any of the embodiments of the transparent article as previously described in this disclosure. The solvent may be selected based on its compatibility with the polymer. In particular, the solvent may be selected based on its ability to soften or dissolve the polymer when the polymer is in powder form. The solvent may be selected from $C_1$-$C_5$ haloalkanes, cyclic ethers, tetrahydrofuran (THF), and combinations thereof. In embodiments, the solvent may be selected from $C_2$-$C_5$ chloroalkanes, $C_2$-$C_5$ fluoroalkanes, monohalomethanes, dihalomethanes, and trihalomethanes, and combinations thereof. In embodiments, the solvent may include chloroform, dichloromethane, or both. Without intending to be bound by hypothesis, the halogenated structure and intrinsic polarity of chloroform and dichloromethane may be desirable for dissolving the polymer matrix. In addition, the relatively fast evaporation rates of chloroform and dichloromethane may contribute to increased transparency in the transparent articles.

In example embodiments, the transparent article 114 may have a weight ratio of nanoparticles in the transparent article to polymer in the transparent article from 1:200 to 1:20, from 1:200 to 1:50, from 1:200 to 1:75, from 1:200 to 1:100, from 1:200 to 1:125, from 1:200 to 1:150, from 1:200 to 1:175, from 1:175 to 1:20, from 1:175 to 1:50, from 1:175 to 1:75, from 1:175 to 1:100, from 1:175 to 1:125, from 1:175 to 1:150, from 1:150 to 1:20, from 1:150 to 1:50, from 1:150 to 1:75, from 1:150 to 1:100, from 1:150 to 1:125, from 1:125 to 1:20, from 1:125 to 1:50, from 1:125 to 1:75, from 1:125 to 1:100, from 1:100 to 1:20, from 1:100 to 1:50, from 1:100 to 1:75, from 1:75 to 1:20, from 1:75 to 1:50, or from 1:50 to 1:20.

In embodiments, the polymer may be in powder form, which may be accomplished by cryogenically grinding the polymer into a fine powder. The polymer may be cryogenically grinded using a SPEX 6750 Freezer/Mill® cryogenic impact mill, manufactured by SPEX USA, or other available machine capable of cryogenic grinding. The fine powder may have an average particle size of from 50 microns (µm) to 2000 µm, from 50 µm to 1000 µm, from 50 µm to 750 µm, from 50 µm to 500 µm, from 50 µm to 250 µm, from 50 µm to 100 µm, from 100 µm to 2000 µm, from 100 µm to 1000 µm, from 100 µm to 750 µm, from 100 µm to 500 µm, from 100 µm to 250 µm, from 250 µm to 2000 µm, from 250 µm to 1000 µm, from 250 µm to 750 µm, from 250 µm to 500 µm, from 500 µm to 2000 µm, from 500 µm to 1000 µm, from 500 µm to 750 µm, from 750 µm to 2000 µm, from 750 µm to 1000 µm, or from 1000 µm to 2000 µm. In embodiments, the fine powder may have an average particle size of from 50 µm to 500 µm, from 50 µm to 400 µm, from 50 µm to 300 µm, from 50 µm to 200 µm, from 50 µm to 100 µm, from 100 µm to 500 µm, from 100 µm to 400 µm, from 100 µm to 300 µm, from 100 µm to 200 µm, from 200 µm to 500 µm, from 200 µm to 400 µm, from 200 µm to 300 µm, from 300 µm to 500 µm, from 300 µm to 400 µm, from 400 µm to 500 µm, less than 500 µm and greater than 200 µm, less than 400 µm and greater than 200 µm, less than 300 µm and greater than 200 µm, less than 500 µm and greater than 300 µm, less than 400 µm and greater than 300 µm, or less than 500 µm and greater than 400 µm.

Cryogenic grinding may encompass techniques such as freezer milling, freezer grinding, or cryomilling. Cryogenic grinding may include cooling the polymer powder and then reducing the particle sizes of the polymer powder. Cooling the polymer powder may include exposing the powder to a cooling agent such as dry ice, liquid carbon dioxide, or liquid nitrogen. The cooled powder may then be finely ground by milling techniques. Without intending to be bound by hypothesis, it may be desirable to use polymer powder instead of using solid polymer chunks or pellets because polymer powder has a greater surface area than solid polymer chunks or pellets. Said another way, polymer powder has a greater surface area-to-volume ratio than that of solid polymer chunks or pellets, leading to greater interaction between the polymer powder and the solvent. Greater interaction between the polymer powder and the solvent may reduce the time required to dissolve the polymer powder, as compared to the time required to dissolve solid polymer chunks or pellets, and may result in reduced haziness and increased clarity in the polymer solution.

In embodiments, the cryogrinding may occur at temperatures of from −50° C. to −200° C., from −75° C. to −200° C., from −100° C. to −200° C., from −125° C. to −200° C., from −150° C. to −200° C., from −175° C. to −200° C., from −190° C. to −200° C., from −50° C. to −190° C., from −75° C. to −190° C., from −100° C. to −190° C., from −125° C. to −190° C., from −150° C. to −190° C., from −175° C. to −190° C., from −50° C. to −175° C., from −75° C. to −175° C., from −100° C. to −175° C., from −125° C. to −175° C., from −150° C. to −175° C., from −50° C. to −150° C., from −75° C. to −150° C., from −100° C. to −150° C., from −125° C. to −150° C., from −50° C. to −125° C., from −75° C. to −125° C., from −100° C. to −125° C., from −50° C. to −100° C., from −75° C. to −100° C., or from −50° C. to −75° C.

In embodiments, the nanoparticles, the solvent, and the polymer may be mixed at a shear speed of from 100 rotations per minute (RPM) to 2000 RPM, from 100 RPM to 1500 RPM, from 100 RPM to 1000 RPM, from 100 RPM to 500 RPM, from 500 RPM to 2000 RPM, from 500 RPM to 1500 RPM, from 500 RPM to 1000 RPM, from 1000 RPM to 2000 RPM, from 1000 RPM to 1500 RPM, or from 1500 RPM to 2000 RPM.

In the methods for producing the transparent article 114, mixing the nanoparticles, the solvent, and the polymer may include adding the nanoparticles to the solvent to form a nanoparticle mixture, sonicating the nanoparticle mixture, thereby dispersing the nanoparticles within the nanoparticle mixture, and adding the polymer to the nanoparticle mixture to form the transparent article precursor 110. In embodiments, the nanoparticles may be dispersed evenly throughout the polymer, with no clumps of nanoparticles, thereby forming a persistent dispersion homogeneity in the transparent article 114, as previously discussed.

In some embodiments, the methods for producing the transparent article 114 may include pouring the transparent article precursor 110 from a vessel 112 into a mold 120, as shown in FIG. 1. The mold 120 may include a flat surface 122, such as a glass sheet, upon which the transparent article precursor 110 is poured. As non-limiting examples, the flat surface 122 may be a glass sheet, a Teflon® sheet, or an aluminum sheet. The material of the mold 120 may include Teflon®, or any other material suitable for holding the transparent article precursor 110 and evaporating the solvent. The mold 120 may have a rectangular shape (as shown), a square shape (not shown), a circular shape (not shown), an ovoid shape (not shown), or any other shape suitable for forming the transparent article 114.

The methods for producing the transparent article 114 may further include placing the mold 120 into an evaporating chamber within a container 130 having an adjustable opening 132. The container 130 may have a sidewall where the adjustable opening 132 is positioned. The container 130 is not limited as to size, shape, or volume. Without intending to be bound by hypothesis, it is contemplated that by enclosing mold 120 in the container 130, a vapor pressure of the solvent within the container 130 is greater than if the mold 120 were positioned in an open environment where the evaporating solvent would not be at least partially contained within the container 130. In turn, the greater vapor pressure in the container 130 may result in a slower evaporation rate of the solvent when the mold 120 is placed within the container 130 than if the mold 120 were placed in an open environment.

The methods for producing the transparent article 114 further include allowing the solvent to evaporate from the transparent article precursor 110 within the evaporating chamber of the container 130, thereby forming the transparent article 114 over the flat surface 122 of the mold 120. In embodiments, allowing the solvent to evaporate from the transparent article precursor 110 may include closing the adjustable opening 132 of the container 130 after placing the mold 120 into the container 130. The adjustable opening 132 of the container 130 may remain closed for from 1 second to 10 days, from 1 second to 5 days, from 1 second to 3 days, from 1 second to 2 days, from 1 second to 1 day, from 1 second to 12 hours, from 1 second to 6 hours, from 1 second to 1 hour, from 1 second to 1 minute, from 1 minute to 10 days, from 1 minute to 5 days, from 1 minute to 3 days, from 1 minute to 2 days, from 1 minute to 1 day, from 1 minute to 12 hours, from 1 minute to 6 hours, from 1 minute to 1 hour, from 1 hour to 10 days, from 1 hour to 5 days, from 1 hour to 3 days, from 1 hour to 2 days, from 1 hour to 1 day, from 1 hour to 12 hours, from 1 hour to 6 hours, from 6 hours to 10 days, from 6 hours to 5 days, from 6 hours to 3 days, from 6 hours to 2 days, from 6 hours to 1 day, from 6 hours to 12 hours, from 12 hours to 10 days, from 12 hours to 5 days, from 12 hours to 3 days, from 12 hours to 2 days, from 12 hours to 1 day, from 1 day to 10 days, from 1 day to 5 days, from 1 day to 3 days, from 1 day to 2 days, from 2 days to 10 days, from 2 days to 5 days, from 2 days to 3 days, from 3 days to 10 days, from 3 days to 5 days, or from 5 days to 10 days. The method may then further include opening the adjustable opening 132 of the container 130 and continuing to allow the solvent to evaporate for an additional 1 hour, 6 hours, 12 hours, 1 day, 2 days, 3 days, or 4 days.

In embodiments, the methods for producing the transparent article 114 may further include increasing an open area of the adjustable opening 132 of the container 130 to increase an evaporation rate of the solvent, while allowing the solvent to evaporate. It is contemplated that the evaporation rate of the solvent is related to the open area of the adjustable opening 132, such that as the open area is increased, the evaporation rate increases. In such embodiments, without intending to be bound by hypothesis, it is contemplated that increasing the evaporation rate of the solvent may increase the formation of voids and air bubbles within the transparent article 114. Therefore, it may be desirable to find a balance between quickly evaporating the solvent and reducing the formation of voids and air bubbles within the transparent article 114.

The methods for producing the transparent article 114 further include flattening the transparent article 114. Flattening the transparent article 114 may include positioning a flat article 140 on a first side of the transparent article 114, where the first side of the transparent article 114 is opposite a side of the transparent article 114 positioned on the flat surface 122 of the mold 120. Flattening the transparent article 114 further includes compressing the transparent article 114 between the flat surface 122 and the flat article 140. Compressing the transparent article 114 may include applying from 5 Newtons (N) to 30 N, from 5 N to 20 N, from 5 N to 15 N, from 5 N to 10 N, from 5 N to 7 N, from 5 N to 6 N, from 6 N to 30 N, from 6 N to 20 N, from 6 N to 15 N, from 6 N to 10 N, from 6 N to 7 N, from 7 N to 30 N, from 7 N to 20 N, from 7 N to 15 N, from 7 N to 10 N, from 10 N to 30 N, from 10 N to 20 N, from 10 N to 15 N, from 15 N to 30 N, from 15 N to 20 N, or from 20 N to 30 N of pressure perpendicular to the flat surface 122. In embodiments, the amount of force applied may correlate to the desired thickness of the transparent article 114. For example, if a relatively thicker transparent article 114 is desired, a lesser force may be applied. Alternatively, if a relatively thinner transparent article 114 is desired, a greater force may be applied. The force may be applied in any suitable direction depending on the orientation and dimensions of the transparent article 114, such as downward when the transparent article is a flat sheet, provided that the force is applied perpendicular to the flat surface. In embodiments, pressure may be applied to the flat article 140, the flat surface 122, or both. The pressure may be applied by any calibration weight kit available, such as those available from Mettler Toledo, headquartered in Columbus, Ohio (USA), or Fisher Scientific, headquartered in Waltham, Massachusetts (USA).

In embodiments, the transparent article 114 may be flattened. Specifically, the transparent article 114 may be flattened after allowing the solvent to evaporate but before the transparent article 114 is fully dried. It is contemplated that the transparent article 114 prior to being fully dried is softer than a fully dried transparent article. Furthermore drying conventionally causes curving due to residual stress and shrinkages during drying and non-uniform thickness throughout the transparent article 114. Therefore, by flattening the transparent article 114 prior to the transparent article's 114 being fully dried, the transparent article 114 is softer than a fully dried transparent article, and the flattening avoids curving and ensures that the dried transparent article 114 will be flat. Without intending to be bound by hypothesis, flattening the transparent article 114 may result in uniform thickness and increased optical transmittance values. The methods for producing the transparent article 114 may then include fully drying the transparent article 114.

EXAMPLE

The following example illustrates one or more additional features of the present disclosure described previously. It should be understood that these examples are not intended to limit the scope of the disclosure or the appended claims in any manner.

To produce a transparent article having 1 wt. % silica nanoparticles, based on the total weight of the transparent article, 0.04 grams (g) of fumed silica with a particle size of 16 nm was dispersed in 80 mL chloroform. The fumed silica was AEROSIL R 972, available from Evonik, and the chloroform. The mixture was then sonicated using a Cole-Parmer Sonicator 8893. The mixture was sonicated for 15 minutes to ensure that the silica is well dispersed in the solvent.

After that the mixture was sonicated, 4 g of PMMA powder was added to the mixture over 1 to 2 minutes. The mixture was stirred until the PMMA was fully dissolved to the satisfaction of visual observation to form the transparent article precursor. The transparent article precursor was poured into a Teflon® mold with a sheet of glass clamped to the base. The mold had a length of 8 cm, a width of 6.3 cm, and a depth of 4 cm. The mold was then placed in sealed glass container with a narrow opening at the top for the solvent to slowly evaporate for three days. Then, the opening was widened about 0.5 to 1.0 cm to increase the evaporation rate, making the solvent evaporate at relatively faster rate for another two days, to form the transparent article. Before the transparent article was completely dried, a glass sheet was placed on top of the transparent article. An 8.4 Newton load was then placed on the glass sheet, sandwiching the transparent article between the two glass sheets, and applying pressure to the transparent article. The load was removed after one to two days, and the transparent article was separated from the glass sheets and stored.

Figure 2:
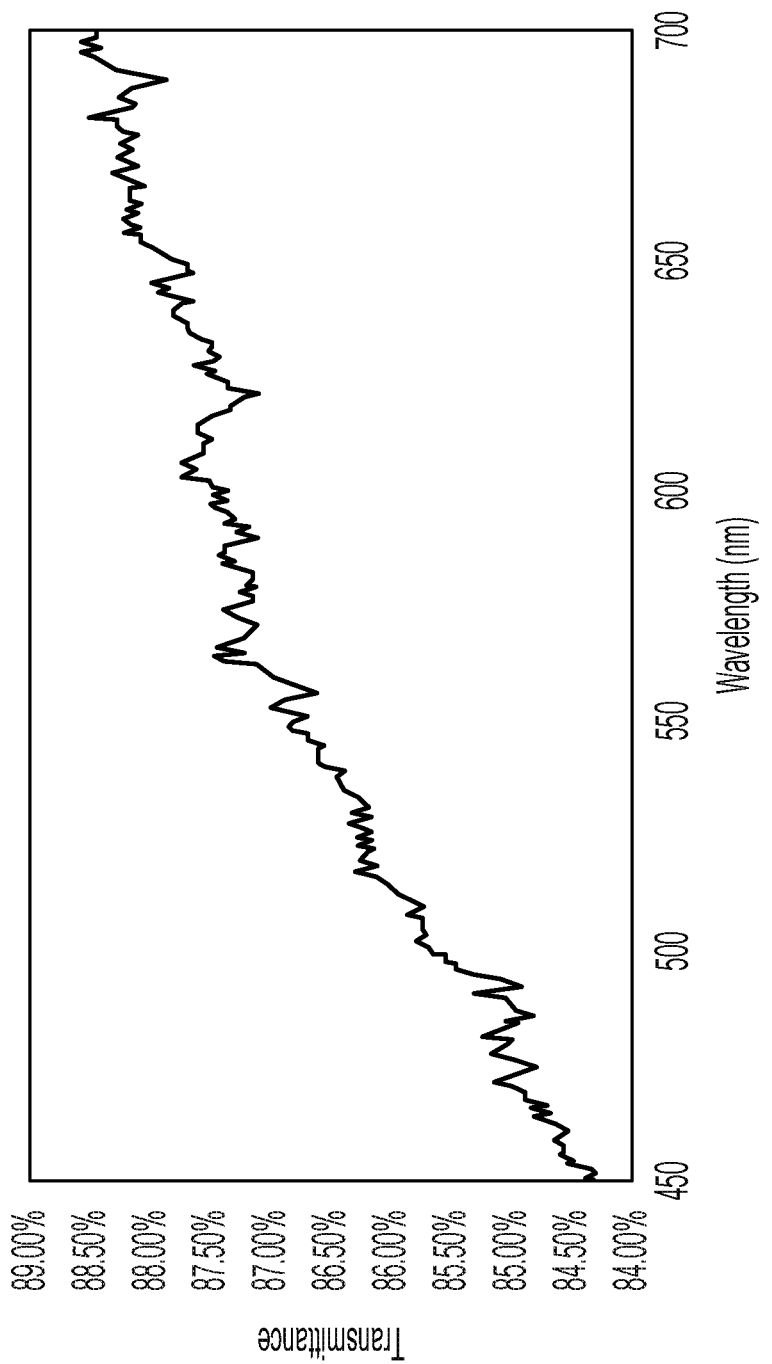
FIG. 2 is a graphical depiction of the transmittance of transparent articles according to embodiments shown and described.

An Edinburgh Instruments FLS 1000 Spectrophotometer, utilizing a Xenon Lamp as a light source, was then used to measure the optical transmittance of the transparent article. First, a small 1 cm×1 cm section of the transparent article was cut and mounted on a custom sample holder. Second, a transmittance scan was conducted using Fluoracle software with a bandwidth of 2 nm, a wavelength range of 450 nm-700 nm, a step size of 1 nm, a 0.2 second dwell time, and 3 repeats, where "Subtract background" and "Excitation Correction" were applied in the program. Third, a background scan was conducted and compared with the transmittance scan to produce the transmittance data for the sample, shown in FIG. 2. For the 1% silica nanoparticle sample in PMMA of this Example, the transmittance value was 87.03% at 500 nm. For the 1% silica nanoparticle sample in PMMA of this Example, the transmittance value was greater than 84.5% for from 450 nm to 700 nm.

It should be apparent to those skilled in the art that various modifications and variations may be made to the embodiments described within without departing from the scope of the claimed subject matter. Thus, it is intended that the specification cover the modifications and variations of the various embodiments described within provided such modifications and variations come within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Embodiments of this disclosure may incorporate one or more of the following aspects of the present disclosure, without limitation:

A first aspect of the present disclosure may be directed to a method of producing a transparent article, the method comprising: pouring a transparent article precursor into a mold, the transparent article precursor comprising nanoparticles, a solvent, and a polymer, and the mold comprising a flat surface; placing the mold into a container having an adjustable opening; and allowing the solvent to evaporate from the transparent article precursor, thereby forming the transparent article over the flat surface of the mold; and flattening the transparent article by: positioning a flat article on a first side of the transparent article; and compressing the transparent article between the flat surface and the flat article.

A second aspect of the present disclosure may be directed to a transparent article comprising: hydrophobic nanoparticles dispersed within a polymer chosen from poly(methyl methacrylate), polycarbonate, polystyrene, polyetherimide, and acrylonitrile butadiene styrene.

Another aspect of the present disclosure may include any of the previous aspects, in which the nanoparticles are selected from silica nanoparticles, titanium oxide nanoparticles, zinc oxide nanoparticles, zirconium oxide nanoparticles, or combinations thereof.

Another aspect of the present disclosure may include any of the previous aspects, in which the nanoparticles comprise hydrophobic nanoparticles, the hydrophobic nanoparticles being a product of reacting silica nanoparticles, titanium oxide nanoparticles, zinc oxide nanoparticles, zirconium oxide nanoparticles, or combinations thereof, with a modifying agent chosen from alkylsilanes, alkoxysilanes, alkylalkoxysilanes, alkylhalosilanes, alkoxyhalosilanes, alkylalkoxyhalosilanes, (haloalkyl)silanes, (haloalkoxy)silanes, (haloalkyl)alkoxysilanes, alkyl(haloalkoxy)silanes, (haloalkyl)(haloalkoxy)silanes, (haloalkyl)halosilanes, (haloalkoxy)halosilanes, (haloalkyl)alkoxyhalosilanes, alkyl(haloalkoxy)halosilanes, (haloalkyl)(haloalkoxy)halosilanes, and combinations thereof.

Another aspect of the present disclosure may include any of the previous aspects, in which the modifying agent is chosen from dimethyldichlorosilane, methyltriethoxysilane, ethyltriethoxysilane, pentyltriethoxysilane, dodecyltriethoxysilane, or combinations thereof.

Another aspect of the present disclosure may include any of the previous aspects, further comprising mixing the nanoparticles, the solvent, and the polymer to form the transparent article precursor.

Another aspect of the present disclosure may include any of the previous aspects, in which mixing the nanoparticles, the solvent, and the polymer comprises: adding the nanoparticles to the solvent to form a nanoparticle mixture; sonicating the nanoparticle mixture to disperse the nanoparticles within the nanoparticle mixture; and adding the polymer to the nanoparticle mixture to form the transparent article precursor.

Another aspect of the present disclosure may include any of the previous aspects, in which 99% of the nanoparticles have a particle size of from 7 nanometers to 50 nanometers.

Another aspect of the present disclosure may include any of the previous aspects, in which the transparent article precursor comprises a weight ratio of nanoparticles to polymer of from 1:200 to 1:20.

Another aspect of the present disclosure may include any of the previous aspects, in which the polymer comprises poly(methyl methacrylate).

Another aspect of the present disclosure may include any of the previous aspects, in which the solvent is selected from $C_1$-$C_5$ haloalkanes.

Another aspect of the present disclosure may include any of the previous aspects, in which the solvent is selected from $C_2$-$C_5$ chloroalkanes, $C_2$-$C_5$ fluoroalkanes, monohalomethanes, dihalomethanes, trihalomethanes, and combinations thereof.

Another aspect of the present disclosure may include any of the previous aspects, further comprising, while allowing the solvent to evaporate, increasing an open area of the adjustable opening of the container to increase an evaporation rate of the solvent.

Another aspect of the present disclosure may include any of the previous aspects, in which allowing the solvent to evaporate from the transparent article precursor comprises: closing the adjustable opening of the container after placing the mold into the container; opening the adjustable opening of the container after closing the adjustable opening of the container; and allowing the solvent to evaporate for at least 2 days.

Another aspect of the present disclosure may include any of the previous aspects, in which compressing the transparent article comprises applying greater than 5 Newtons of pressure perpendicular to the flat surface.

Another aspect of the present disclosure may include any of the previous aspects, in which the transparent article has an optical transmittance greater than 80% at wavelengths from 400 nm to 750 nm.

Another aspect of the present disclosure may include any of the previous aspects, in which: the hydrophobic nanoparticles comprise silica nanoparticles; 99% of the nanoparticles have a particle size of from 7 nanometers to 50 nanometers; and the transparent article comprises from 0.5 wt. % to 5 wt. % nanoparticles, based on the total weight of the transparent article.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some features in embodiments or aspects of the present disclosure are identified as particularly advantageous, it is contemplated that the present disclosure is not necessarily limited to such features.

What is claimed is:

1. A method of producing a transparent article, the method comprising:
    pouring a transparent article precursor into a mold, the transparent article precursor comprising nanoparticles, a solvent, and a polymer, and the mold comprising a flat surface;
    placing the mold into a container having an adjustable opening; and
    allowing the solvent to evaporate from the transparent article precursor, thereby forming the transparent article over the flat surface of the mold; and
    flattening the transparent article by:
        positioning a flat article on a first side of the transparent article; and
        compressing the transparent article between the flat surface and the flat article; and
    wherein the transparent article precursor comprises a weight ratio of nanoparticles to polymer of from 1:200 to 1:20.

2. The method of claim 1, in which the nanoparticles are selected from silica nanoparticles, titanium oxide nanoparticles, zinc oxide nanoparticles, zirconium oxide nanoparticles, or combinations thereof.

3. The method of claim 1, in which the nanoparticles comprise hydrophobic nanoparticles, the hydrophobic nanoparticles being a product of reacting silica nanoparticles, titanium oxide nanoparticles, zinc oxide nanoparticles, zirconium oxide nanoparticles, or combinations thereof, with a modifying agent chosen from alkylsilanes, alkoxysilanes, alkylalkoxysilanes, alkylhalosilanes, alkoxyhalosilanes, alkylalkoxyhalosilanes, (haloalkyl)silanes, (haloalkoxy)silanes, (haloalkyl)alkoxysilanes, alkyl(haloalkoxy)silanes, (haloalkyl)(haloalkoxy)silanes, (haloalkyl)halosilanes, (haloalkoxy)halosilanes, (haloalkyl)alkoxyhalosilanes, alkyl(haloalkoxy)halosilanes, (haloalkyl)(haloalkoxy)halosilanes, and combinations thereof.

4. The method of claim 3, in which the modifying agent is chosen from dimethyldichlorosilane, methyltriethoxysilane, ethyltriethoxysilane, pentyltriethoxysilane, dodecyltriethoxysilane, or combinations thereof.

5. The method of claim 1, further comprising mixing the nanoparticles, the solvent, and the polymer to form the transparent article precursor.

6. The method of claim 5, in which mixing the nanoparticles, the solvent, and the polymer comprises:
    adding the nanoparticles to the solvent to form a nanoparticle mixture;
    sonicating the nanoparticle mixture to disperse the nanoparticles within the nanoparticle mixture; and
    adding the polymer to the nanoparticle mixture to form the transparent article precursor.

7. The method of claim 1, in which 99% of the nanoparticles have a particle size of from 7 nanometers to 50 nanometers.

8. The method of claim 1, in which the solvent is selected from $C_1$-$C_5$ haloalkanes.

9. The method of claim 8, in which the solvent is selected from $C_2$-$C_5$ chloroalkanes, $C_2$-$C_5$ fluoroalkanes, monohalomethanes, dihalomethanes, trihalomethanes, and combinations thereof.

10. The method of claim 9, further comprising, while allowing the solvent to evaporate, increasing an open area of the adjustable opening of the container to increase an evaporation rate of the solvent.

11. The method of claim 1, in which allowing the solvent to evaporate from the transparent article precursor comprises:
    closing the adjustable opening of the container after placing the mold into the container;
    opening the adjustable opening of the container after closing the adjustable opening of the container; and
    allowing the solvent to evaporate for at least 2 days.

12. The method of claim 1, in which compressing the transparent article comprises applying greater than 5 Newtons of pressure perpendicular to the flat surface.

13. A method of producing a transparent article, the method comprising:
    mixing nanoparticles, a solvent, and a polymer to form a transparent article precursor, in which:
        the nanoparticles comprise hydrophobic nanoparticles, the hydrophobic nanoparticles being a product of reacting silica nanoparticles, titanium oxide nanoparticles, zinc oxide nanoparticles, zirconium oxide nanoparticles, or combinations thereof, with a modifying agent chosen from alkylsilanes, alkoxysilanes, alkylalkoxysilanes, alkylhalosilanes, alkoxyhalosilanes, alkylalkoxyhalosilanes, (haloalkyl)silanes, (haloalkoxy)silanes, (haloalkyl)alkoxysilanes, alkyl (haloalkoxy)silanes, (haloalkyl)(haloalkoxy)silanes, (haloalkyl)halosilanes, (haloalkoxy)halosilanes, (haloalkyl)alkoxyhalosilanes, alkyl(haloalkoxy)halosilanes, (haloalkyl)(haloalkoxy)halosilanes, and combinations thereof;

the solvent is selected from $C_2$-$C_5$ chloroalkanes, $C_2$-$C_5$ fluoroalkanes, monohalomethanes, dihalomethanes, and trihalomethanes, and combinations thereof, and the polymer comprises poly(methyl methacrylate);

pouring the transparent article precursor into a mold comprising a flat surface;

placing the mold into a container having an adjustable opening;

closing the adjustable opening of the container after placing the mold into the container;

opening the adjustable opening of the container after closing the adjustable opening of the container;

allowing the solvent to evaporate from the transparent article precursor, thereby forming the transparent article over the flat surface of the mold; and flattening the transparent article, in which flattening the transparent article comprises:

positioning a flat article on a first side of the transparent article; and compressing the transparent article between the flat surface and the flat article.

14. The method of claim 1, in which the transparent article has an optical transmittance greater than 80% at wavelengths from 400 nm to 750 nm.

15. The method of claim 3, in which:

the polymer comprises poly(methyl methacrylate);

the hydrophobic nanoparticles comprise silica nanoparticles;

99% of the nanoparticles have a particle size of from 7 nanometers to 50 nanometers; and the transparent article comprises from 0.5 wt. % to 5 wt. % nanoparticles, based on the total weight of the transparent article.

16. A method of producing a transparent article, the method comprising:

adding nanoparticles to a solvent to form a nanoparticle mixture;

sonicating the nanoparticle mixture to disperse the nanoparticles within the nanoparticle mixture;

adding a polymer to the nanoparticle mixture to form the transparent article precursor;

pouring the transparent article precursor into a mold comprising a flat surface;

placing the mold into a container having an adjustable opening; and allowing the solvent to evaporate from the transparent article precursor, thereby forming the transparent article over the flat surface of the mold; and flattening the transparent article by:

positioning a flat article on a first side of the transparent article; and compressing the transparent article between the flat surface and the flat article.

17. The method of claim 16, wherein the transparent article precursor comprises a weight ratio of nanoparticles to polymer of from 1:200 to 1:20.

18. The method of claim 16, wherein the polymer is chosen from poly(methyl methacrylate), polycarbonate, polystyrene, polyetherimide, and acrylonitrile butadiene styrene.

19. The method of claim 16, wherein:

the solvent is selected from $C_2$-$C_5$ chloroalkanes, $C_2$-$C_5$ fluoroalkanes, monohalomethanes, dihalomethanes, trihalomethanes, and combinations thereof; and the method further comprises, while allowing the solvent to evaporate, increasing an open area of the adjustable opening of the container to increase an evaporation rate of the solvent.

20. The method of claim 1, in which the polymer is chosen from poly(methyl methacrylate), polycarbonate, polystyrene, polyetherimide, and acrylonitrile butadiene styrene.

\* \* \* \* \*